United States Patent [19]

Brunn et al.

[11] Patent Number: 4,649,558

[45] Date of Patent: Mar. 10, 1987

[54] X-RAY DIAGNOSTIC SYSTEM WITH AN IMAGE INTENSIFIER TELEVISION CHAIN

[75] Inventors: Klaus Brunn, Erlangen; Walter Polster, Spardorf, both of Fed. Rep. of Germany

[73] Assignee: Siemens Aktiengesellschaft, Berlin and Munich, Fed. Rep. of Germany

[21] Appl. No.: 734,803

[22] Filed: May 15, 1985

Related U.S. Application Data

[63] Continuation-in-part of Ser. No. 234,423, Feb. 13, 1981.

[30] Foreign Application Priority Data

Mar. 14, 1980 [DE] Fed. Rep. of Germany ....... 3009952

[51] Int. Cl.[4] .............................................. G03B 41/16

[52] U.S. Cl. ....................................... 378/97; 378/108

[58] Field of Search .......................... 378/108, 97, 112

[56] References Cited

U.S. PATENT DOCUMENTS 4,309,613 1/1982 Brunn et al. .......................... 378/97

4,566,115 1/1986 Brünn et al. .......................... 378/97

*Primary Examiner*—Craig E. Church

*Assistant Examiner*—David Porta

*Attorney, Agent, or Firm*—Hill, Van Santen, Steadman & Simpson

[57] ABSTRACT

In an exemplary embodiment including a dose rate control device for fluoroscopy and an automatic control for x-ray exposures, a memory device is provided in which a respective pair of values for the x-ray tube output and for the exposure time is stored for each patient transparency and further exposure values. Further, a detector is provided which changes the pair of values called up when the exposure time switched by the exposure control deviates from the exposure time called up by a prescribed measure.

3 Claims, 4 Drawing Figures

X-RAY DIAGNOSTIC SYSTEM WITH AN IMAGE INTENSIFIER TELEVISION CHAIN

This is a continuation-in-part of application Ser. No. 234,423 filed Feb. 13, 1981.

BACKGROUND OF THE INVENTION

The invention relates to an x-ray diagnostic system with an image intensifier television chain, a dose rate control means for fluoroscopy for maintaining the mean image intensity constant during a fluoroscopic examination via a fluoroscopic parameter, and with an automatic exposure control with an integrator for the formation of a signal corresponding to the respective x-ray dose per image, said signal effecting the shutdown of the x-radiation via a switching stage when a prescribed dose value is reached, as well as with means for setting the exposure x-ray tube voltage as a function of the patient transparency.

An x-ray diagnostic system of this type is described in the German AS 19 29 894 and in the corresponding U.S. Pat. No. 3,546,461 issued Dec. 8, 1970. Given this x-ray diagnostic system, when a prescribed time window for the exposure time of an x-ray exposure is fallen below or exceeded, the x-ray tube voltage is influenced in such manner that the exposure time of the image following an adjustment operation again lies within the limits prescribed by the time window. Said publication states nothing concerning the setting of the further exposure values, particularly of the x-ray tube output, and concerning the overload protection of the x-ray tube.

SUMMARY OF THE INVENTION

The object of the invention is to design an x-ray diagnostic system of the type initially cited in such manner that an automatic matching of all exposure values to the respective patient transparency ensues, whereby an optimum exploitation of the loadability of the x-ray tube is given.

This object is inventively achieved in that a memory device is provided in which a respective pair of values for the x-ray tube output and for the exposure time is stored for each patient transparency and further exposure values; in that a transparency signal is supplied to said memory device, said transparency signal corresponding to at least one fluoroscopy parameter automatically set at the fluoroscopic examination preceding an x-ray exposure or exposure series and generating signals at the output of the memory device which correspond to the allocated, stored pair of values and which are supplied to the x-ray generator for its adjustment; and in that a detector is provided which changes the pair of values called up when the exposure time switched by the exposure automat deviates from the exposure time called up by a prescribed measure. Given the inventive x-ray diagnostic system, a signal which embodies the transparency of the patient is derived from a fluoroscopic value, for example from the x-ray tube voltage during a fluoroscopic examination which precedes an x-ray exposure or exposure series. Said signal then effects the automatic setting of the x-ray tube output and of the exposure time for an exposure or exposure series. Thereby, an optimum pair of values for the x-ray tube output and for the exposure time can be programmed for each patient transparency and further exposure values, particularly for the image frequency, the set time and the selected focus of the x-ray tube, so that the loadability of the x-ray tube is fully exploited.

A further development of the invention resides in that a function generator is contained within the memory device for fixing a time window for the exposure time as a function of the transparency signal. Given this further development, no correction of the set pair of values for the x-ray tube output and for the time window ensues when the switched exposure time lies within the time window. However, if the time window is transgressed toward the upper or lower limit, then the pair of values is changed so that the exposure time lies within the time window in the next exposure. If a change of the pair of values is no longer possible, then the x-ray tube voltage can also be additionally influenced for matching to the patient transparency.

A further embodiment of the invention has the feature that means are provided for the free setting of the x-ray tube voltage, said means supplying correction signals for the remaining exposure values in order to prevent an overload of the x-ray tube.

In the following, the invention is described in greater detail on the basis of an exemplary embodiment illustrated on the accompanying drawing sheets; and other objects, features and advantages will be apparent from this detailed disclosure and from the appended claims.

BRIEF DESCRIPTION OF THE DRAWINGS

FIGS. 1A and 1B show the circuit of FIG. 1 in respective switching conditions.

DETAILED DESCRIPTION

Figure 1:
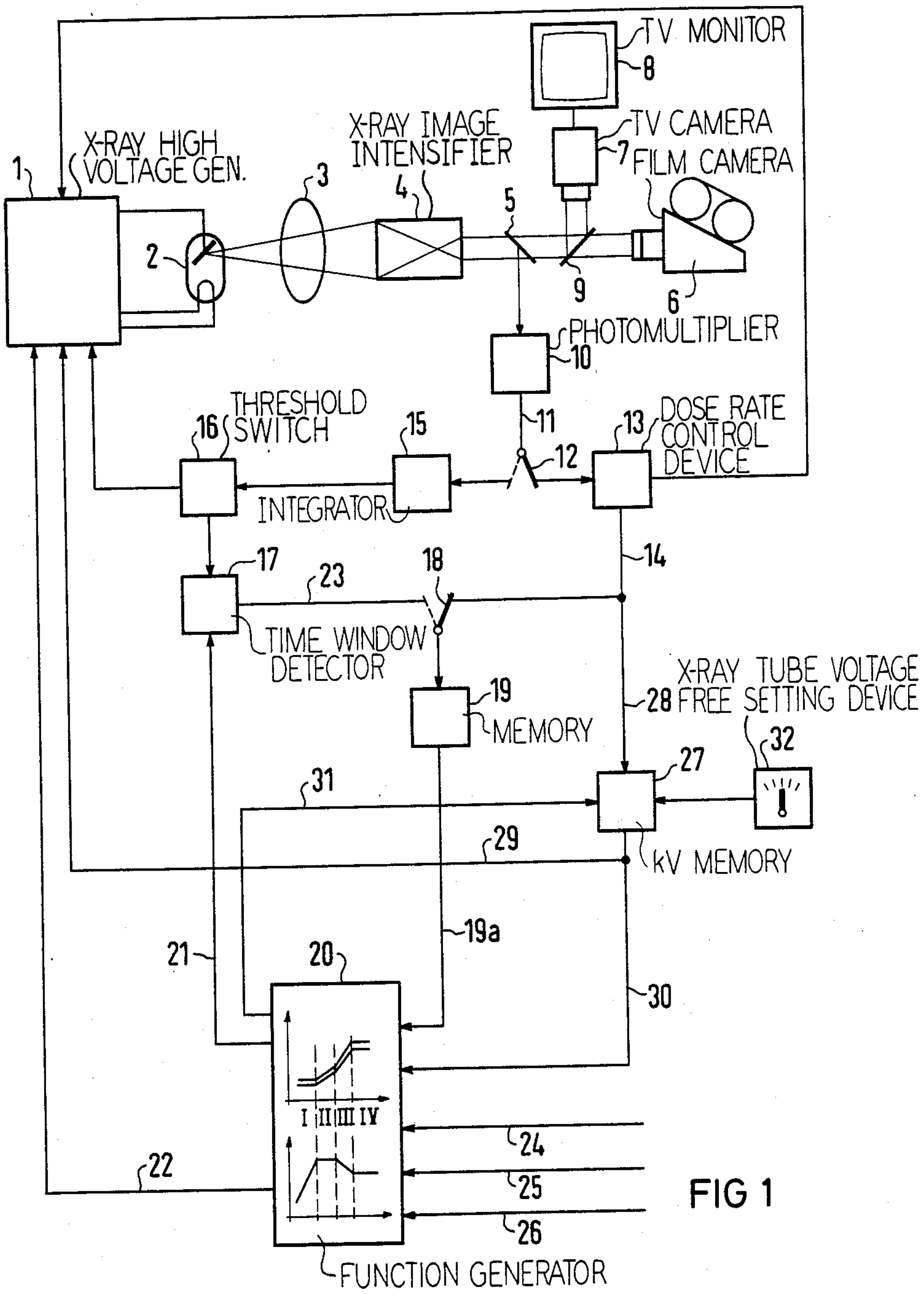
FIG. 1 shows a circuit diagram of an x-ray diagnostic system according to the invention.

FIG. 1 shows an x-ray apparatus or high voltage generator 1 which feeds an x-ray tube 2 which transilluminates a patient 3 and generates an x-ray shadow on the input screen of an x-ray image intensifier 4. The output image of the x-ray image intensifier 4 is supplied to a film camera 6 as well as to a television camera 7 via a semitransparent mirror 9. The television camera 7 generates a fluoroscopic image on a television monitor 8.

A mirror 5 which is likewise semipermeable lies in the beam path between the output screen of the x-ray image intensifier 4 and the mirror 9, said mirror 5 supplying a light signal which corresponds to the mean image intensity to a photomultiplier 10. Said light signal is converted by the photomultiplier 10 into a corresponding electrical signal which appears at its output 11. Via a switch 12, said signal can be supplied during the fluoroscopic examination to a dose rate control means 13 which varies the fluoroscopic values, i.e., the x-ray tube current and the x-ray tube voltage, during fluoroscopy in such manner that the mean image intensity remains constant. It supplies a transparency signal at its output 14 which corresponds to the respective fluoroscopic values and, thus, to the patient transparency.

During an x-ray exposure, the photomultiplier 10 supplies a signal to an integrator 15 via the switch 12 in its position illustrated with broken lines, said signal being converted by means of integration into a signal corresponding to the radiation dose which is supplied to a threshold switch 16. The threshold switch 16 compares the voltage at the integrator 15 to a reference voltage and supplies a shutdown signal to the x-ray high voltage generator 1 when the output of the integrator 15 exceeds the reference voltage, thus meaning a prescribed radiation dose has been achieved; thus, it fixes the exposure time for an x-ray exposure. The components 10, 15 and 16 thus form an automatic exposure control for the formation of a signal corresponding to the x-ray dose per image, said signal effecting the shutdown of the x-radiation via the threshold switch 16 as a switching stage when a prescribed dose is achieved.

A time window detector 17 is connected to the threshold switch 16, said time window detector prescribing an adjustable time window for the exposure time of an x-ray exposure. The time window detector compares the actual elapsed exposure time to a value received from a function generator 20, and supplies a signal if this value is exceeded. During an x-ray exposure, a switch 18 is placed in its position indicated with broken lines, so that a correction of the exposure values is possible in the manner to be described below when the exposure time switched by the automatic exposure control transgresses the upper or lower limit respectively of the prescribed time window.

A line leads from the switch 18 to a memory 19 in which information for the function generator 20 is stored for each transparency. The dependency of the time window and of the x-ray tube output on the transparency is stored in the function generator 20. A signal corresponding to the time window pends at output 21 and a signal corresponding to the x-ray tube output pends at output 22.

During a fluoroscopic examination, the switches 12 and 18 assume the positions illustrated with solid lines. Thereby, the mean image intensity is kept constant and the memory 19 receives a signal via the line 14 which corresponds to the transparency, so that it supplies an information signal to the function generator 20 which corresponds to the transparency. During fluoroscopy, the function generator 20 as well as the components 15, 16, 17 are disconnected from the generator 1.

If, after a fluoroscopic examination, a motion picture scene is to be recorded, then the switches 12 and 18 are placed in the positions indicated with broken lines. Thereby, the x-ray tube output is set via the function generator 20. Further, the window detector 17 receives a signal which corresponds to the width of the time window and to the upper and lower limit of the time window, whereby said values are likewise determined as a function of the transparency.

During an x-ray exposure with a motion picture type recording, the window detector 17 now monitors to see whether the exposure time lies within the time window fixed by the function generator 20. If this is not the case, then, via the line 23, it influences the memory 19, i.e., as a function of the exposure time actually switched, it selects a new transparency information signal from the memory 19 which interrogates a new pair of values for the time window and for the x-ray tube output from the function generator 20. Said new pair of values is now set in the x-ray high voltage generator 1 and is input into the window detector 17. If the exposure time then lies within the new time window, then no further correction ensues; should this not be the case, another correction ensues, namely until the exposure time lies within the time window. A signal is supplied to the function generator 20 via a line 24 which corresponds to the image frequency, via a line 25 which corresponds to the set time and via a line 26 which corresponds to the selected focus of the x-ray tube, said signals being in addition to the transparency signal on the line 19*a* effecting the selection of the pair of values for the x-ray tube output and for the exposure time.

The x-ray tube voltage is automatically determined as a function of the transparency of the patient. To this end, a small kV memory 27 is provided which receives a signal corresponding to the patient transparency at its input 28 and in which an optimum x-ray tube output is stored for each patient transparency. A signal corresponding to the x-ray tube voltage called up effects the setting of the x-ray tube voltage in the x-ray high voltage generator 1 via the line 29. At the same time, the function generator 20 receives a signal corresponding to the x-ray tube voltage called up, via the line 30, so that said function generator can set a pair of values consisting of the x-ray tube output and exposure time which is required for the proper exposure and is admissible for a series of exposures. When the switched exposure time inadmissibly deviates from the time called up in the function generator 20, but a correction via the x-ray tube output and the time window, i.e., the pulse width, is no longer possible for an x-ray exposure, then the x-ray voltage is corrected via the line 31, i.e., a new, suitable x-ray tube voltage value is called up in the kV memory 27.

A setting device 32 for the free setting of the x-ray tube voltage is connected to the kV memory 27. If said free setting ensues, then the function generator 20 receives a correction signal via the line 30, so that the exposure time, i.e., the time window, and the x-ray tube output are fixed in such manner that the proper exposure continues to be maintained (i.e., the dose per image is constant) and an overload of the x-ray tube is prevented with certainty. Said overload is likewise prevented with certainty during the automatic setting of the x-ray tube voltage, since only such pairs of values consisting of exposure time and x-ray tube output are called up from the function generator 20 and only such an x-ray tube voltage is set via the kV memory 27 for each patient transparency that the x-ray tube 2 is not overloaded.

Figure 2:
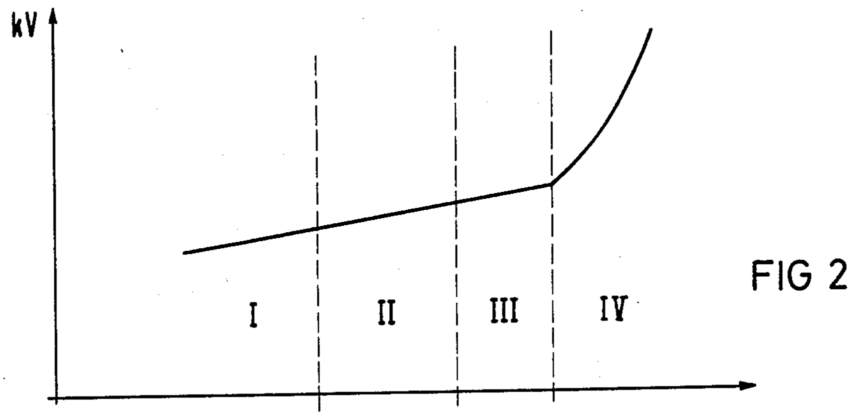
FIGS. 2 through 4 show graphic illustrations for explaining the operation of FIG. 1, and FIGS. 2A, 3A and 4A show the illustrations of FIGS. 2, 3 and 4, respectively, for an exemplary operating conditon, so as to correlate the graphical illustrations with FIGS. 1A and 1B.
Figure 3:
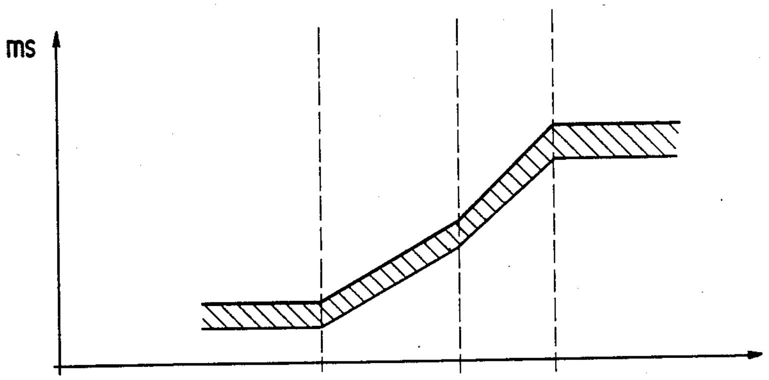
Figure 4:
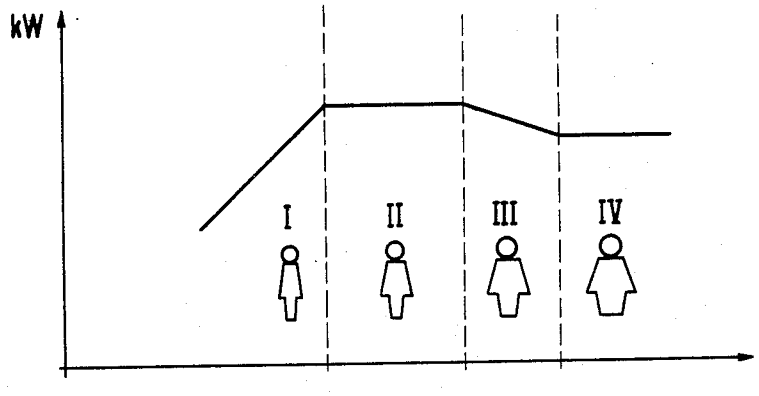

Four transparency ranges I through IV of a patient are illustrated in FIGS. 2 through 4. Thereby, FIG. 2 shows the course of the x-ray tube voltage dependent on the patient thickness which is programmed in the kV memory 27; FIG. 3 shows the course of the time window as a function of the patient thickness and FIG. 4 shows the course of the x-ray tube output as a function of the patient thickness. Data in accordance with FIGS. 3 and 4 is programmed in the function generator 20. In FIGS. 2, 3, and 4, the range I corresponds to a very thin patient, and the range IV corresponds to a very fat patient. The patient thicknesses allocated to ranges I through IV, thus, increase from I through IV, that is from left to right along the abscissa axes in FIGS. 2, 3, and 4.

FIGS. 3 and 4 show that, as a function of the patient thickness, pairs of values first comprised of, for instance, a constant exposure time and an increasing x-ray tube output are programmed (range I); that, in range II, increasing values of the exposure time are then stored given a constant x-ray tube output; that, in range III, exposure times which increases further are then prescribed given a decreasing x-ray tube output; and, finally, that given a reduced, constant x-ray tube output and a constant exposure time, the x-ray tube voltage (FIG. 2) increases. In range IV, thus, the described call-up of new x-ray tube voltage values from the kV memory 27 by means of the function generator 20 ensues.

In the exemplary embodiment, a time window is prescribed for the exposure time switched by means of the exposure automat 10, 15, 16. If the exposure time lies within the time window, then no correction of the pair of values consisting of exposure time (time window) and x-ray tube output ensues, and likewise with no correction of the x-ray tube voltage. If this is not the case, at least the pair of values consisting of exposure time and x-ray tube output, if need be also the x-ray tube voltage (range IV), are changed, so that the exposure time again lies within the time window at the next exposure after the change. It is also possible to prescribe a single exposure time value proceeding from the function generator 20 instead of a time window. In this case, a correction then ensues when the exposure time actually connected does not coincide with the prescribed exposure time value. In the exemplary embodiment, the time window is prescribed by means of a function generator circuit in the function generator 20. The corresponding functions are indicated for the function generator 20 in FIG. 1. They correspond to the functions according to FIGS. 3 and 4.

The setting of the x-ray tube voltage via the kV memory 27, of course, only ensues in exposure operation. In fluoroscopy operation, this task is assumed by the dose rate control means 13.

It will be apparent that many modifications and variations may be effected without departing from the scope of the novel concepts and teachings of the present invention.

SUPPLEMENTARY DISCUSSION

During a fluoroscopic examination, the switches 12 and 18 assume the positions illustrated with the solid lines in FIG. 1A. Thereby, the mean image intensity is kept constant and the memory 19 receives a signal, e.g., UF1, FIG. 1A, via the line 14 which corresponds to the transparency, so that it supplies an information signal (e.g. TRI, FIGS. 1A and 1B) to the function generator 20 which corresponds to the transparency. During fluoroscopy, the function generator 20 as well as the components 15, 16, 17 are disconnected from the generator 1 as shown in FIG. 1A.

The x-ray tube voltage is automatically determined as a function of the transparency of the patient. To this end, a small kV memory 27 is provided which receives a signal (e.g. UF1, FIG. 1A) corresponding to the patient transparency at its input 28 and in which an optimum x-ray tube output (kV, FIG. 2A) is stored for each patient transparency (TR, FIG. 2A). A signal (e.g. kV1, FIG. 2A) corresponding to the x-ray tube voltage called up effects the setting of the x-ray tube voltage in the x-ray generator 1 via the line 29 (see FIG. 1B). At the same time, the function generator 20 receives a signal (e.g. KV1, FIG. 1A) corresponding to the x-ray tube voltage called up, via the line 30, so that said function generator can set a pair of values consisting of the x-ray tube output and exposure time which is required for the proper exposure and is admissible for a series of exposures.

If, after a fluoroscopic examination, a motion picture scene is to be recorded, then the switches 12 and 18 are placed in the positions indicated with the broken lines in FIG. 1 (positions 12*a* and 18*a*, FIG. 1B). Thereby, the x-ray tube output (kW, FIG. 4A) is set via the function generator 20. Further, the window detector 17 receives a signal (ms, FIG. 3A) which corresponds to the width of the time window and to the upper and lower limit of the time window (msU and msL, FIG. 3A) whereby said values are likewise determined as a function of the transparency (TR, FIG. 3A).

During an x-ray exposure with a motion picture type recording, the window detector 17 now monitors to see whether the exposure time (ms (actual), FIG. 3A) lies within the time window (FIG. 3A) fixed by the fuction generator 20. If this is not the case, e.g. ms (actual) >msU, FIG. 3A, then, via the line 23, it influences the memory 19, i.e., as a function of the exposure time actually switched, it selects a new transparency information signal, e.g. TR2, FIGS. 3A and 4A, from the memory 19 which interrogates a new pair of values for the time window (FIG. 3A) and for the x-ray tube output (e.g. kW2, FIG. 4A) from the function generator 20. Said new pair of values is now set in the x-ray generator 1 and is input into the window detector 17. If the exposure time then lies within the new time window, then no further correction ensues; should this not be the case, another correction ensues, namely until the exposure time lies wihtin the time window. A signal is supplied to the function generator 20 via a line 24 which corresponds to the image frequency, via a line 25 which corresponds to the set time and via a line 26 which corresponds to the selected focus of the x-ray tube, said signals being in addition to the transparency signal on the line 19*a* effecting the selection of the pair of values for the x-ray tube output and for the exposure time.

We claim as our invention:

1. An x-ray diagnostic system comprising x-ray apparatus having an x-ray tube for producing an x-ray image and said x-ray tube being responsive during fluroscopy to the control of a fluoroscopy parameter comprising at least one of x-ray tube current and x-ray tube voltage for controlling a mean image intensity produced by means of said x-ray tube, an x-ray image intensifier television chain comprising an x-ray image intensifier (4) having an input means for receiving an input x-ray image as produced by said x-ray tube and having an output means for supplying an optical image in accordance with said input x-ray image, and video camera means (7) optically coupled with said output means of said x-ray image intensifier (4) for producing a video signal in accordance with said optical image supplied by said output means, dose rate control means operable during fluoroscopy for receiving a signal which is a measure of the mean image intensity produced by means of said x-ray tube and connected with said x-ray apparatus for controlling the fluoroscopy parameter to maintain the mean image intensity constant during fluoroscopy, automatic exposure control means connected with said x-ray apparatus for controlling the duration of an x-ray exposure operation of said x-ray tube to determine an actual exposure time, and including an integrator (15) for forming a dose signal corresponding to an x-ray dose supplied by the x-ray tube during an x-ray exposure operation, and a switching stage (16) connected with said integrator (15) and responsive to said dose signal for effecting a termination of an x-ray exposure when a prescribed x-ray dose value is achieved, and setting means connected with said x-ray apparatus and operable during x-ray exposure operation for setting x-ray tube voltage as a function of patient transparency, signal generation mean (20) connected with said x-ray apparatus and operable during x-ray exposure operation for generating respective pairs of first and second signal values for representing the power to be supplied to said x-ray tube and a relevant value of exposure time of an x-ray exposure for each respective patient transparency, transparency signal forming means connected with said signal generation means (20) for supplying a transparency signal to said signal generation means (20) in accordance with a fluoroscopy parameter of said x-ray tube during a fluoroscopy examination preceding an x-ray exposure operation, said signal generation means being operable during the x-ray exposure operation to supply a first output signal to said x-ray apparatus in accordance with a first of the pair of signal values corresponding to the transparency signal received from said transparency signal forming means thereby to select the power to be supplied to said x-ray tube, and being operable during an x-ray exposure operation to supply a second output signal in accordance with a second of the pair of signal values corresponding to the transparency signal received from said transparency signal forming means for representing a relevant value of exposure time suitable for the x-ray exposure operation, and a detector (17) connected with said signal generation means (20) for receiving said second output signal therefrom for comparison with actual exposure time as determined by said automatic exposure control means, said detector (17) being connected with said transparency signal forming means for actuating said signal generation means (20) to change at least one of said output signals when the detector (17) detects a deviation of the acutal exposure time from the relevant value of exposure time as represented by said second output signal from said signal generation means (20).

2. An x-ray diagnostic system according to claim 4, with said signal generation means comprising a function generator (20) connected with said detector (17) and operable for supplying a second output signal to said detector (17) for representing a time window for the exposure time, said function generator (20) having an input connected with said transparency signal forming means for receiving said transparency signal therefrom and being operable for generating resppective different second output signals as a function of respective different values of said transparency signal, thereby to supply a second output signal to said detector (17) for representing a time window for the exposure time suitable to the transparency of a patient under examination.

3. An x-ray diagnostic system according to claim 4 with said setting means comprising selecting means for manually setting the x-ray tube voltage, said selecting means being connected with said signal generation means for supplying correction signals to said signal generation means such that the dose per image remains constant and an overload of the x-ray tube is prevented.

* * * * *